Nov. 4, 1952 — M. A. LAMB — 2,616,586
FLOATING COVER
Filed April 26, 1948 — 2 SHEETS—SHEET 1
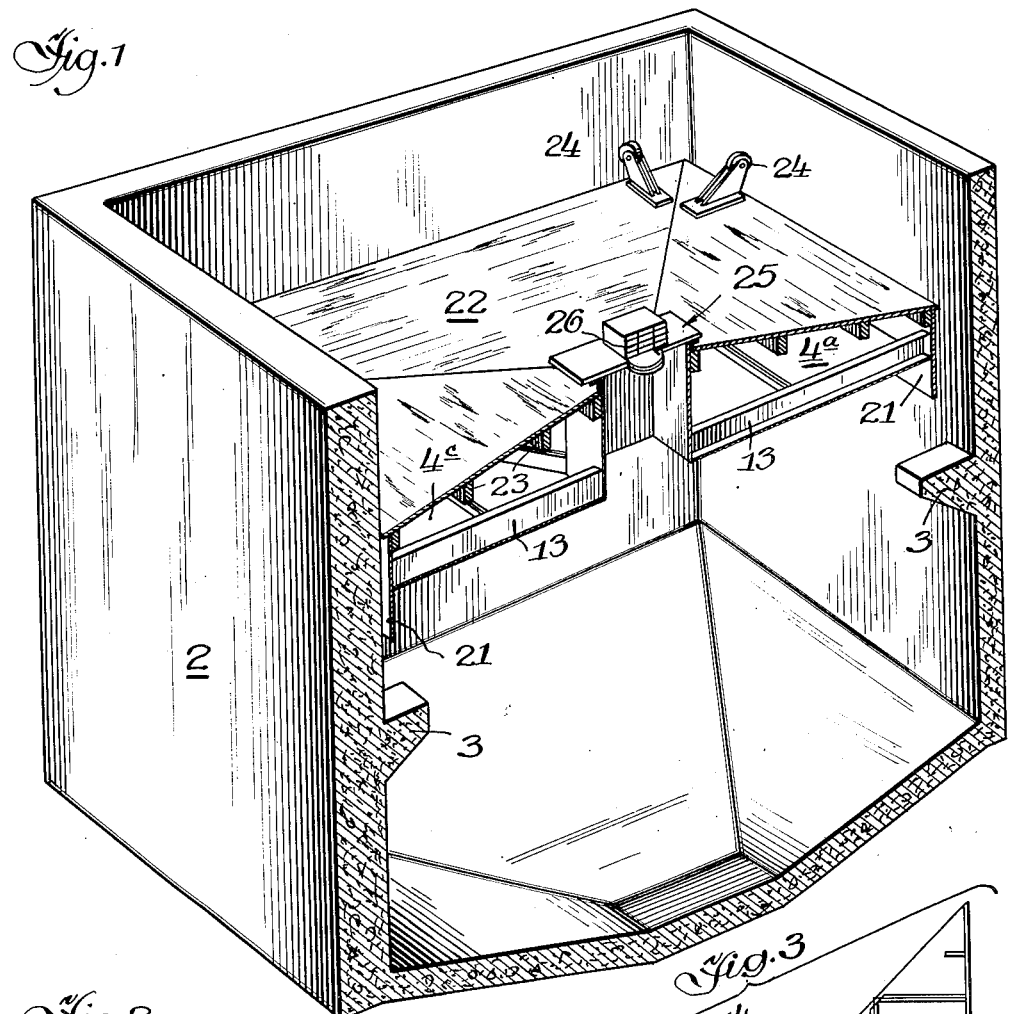
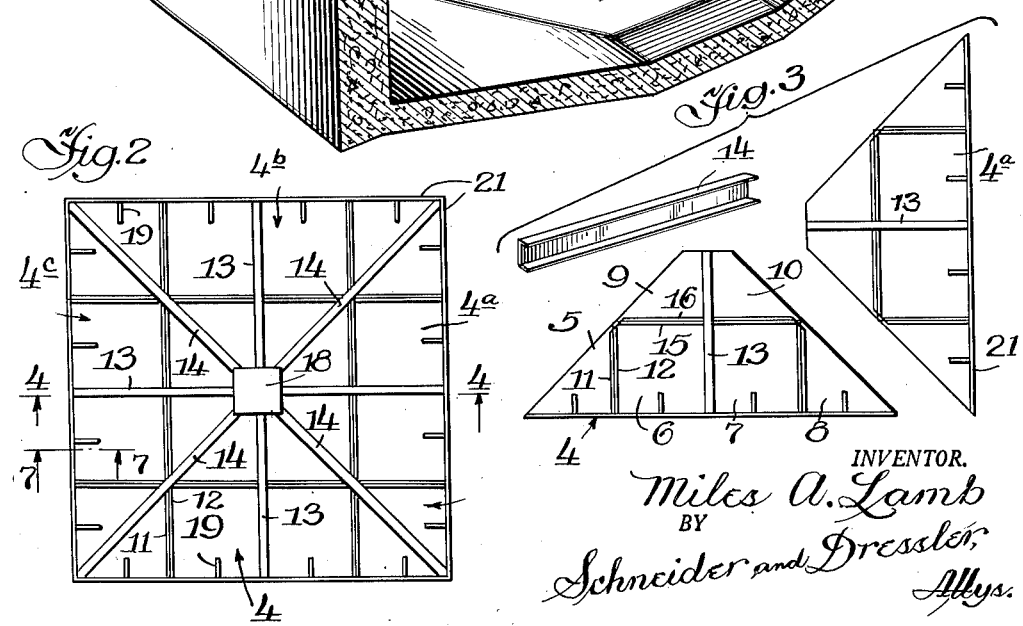
INVENTOR.
Miles A. Lamb
BY Schneider and Dressler,
Attys.

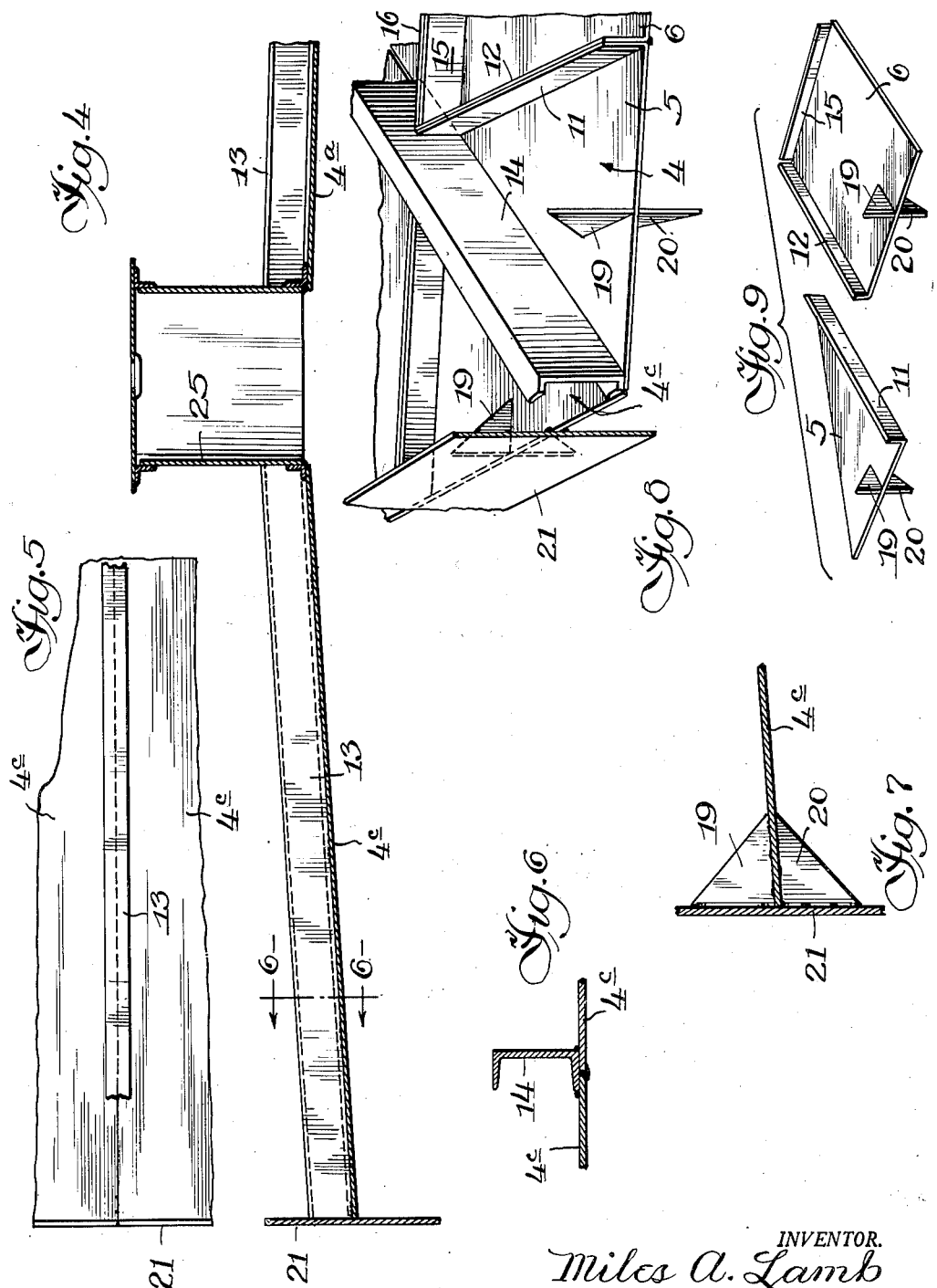

Patented Nov. 4, 1952

2,616,586

UNITED STATES PATENT OFFICE 2,616,586

FLOATING COVER

Miles A. Lamb, Chicago, Ill., assignor to Chicago Pump Company, a corporation of Delaware Application August 26, 1948, Serial No. 46,230

2 Claims. (Cl. 220—26)

This invention relates to a cover for a tank, especially a floating cover, and particularly to a cover that is comprised of sections fabricated in a factory and then transported to the installation site for final assembly into the finished product.

Covers constructed in accordance with the disclosure of the present invention are adaptable for use with many different types of tanks or other similar structures, but the specific embodiment illustrated in the drawings is especially designed for use in, and will be described in connection with, a sludge digestion tank of a sewage treating plant. The cover illustrated in the drawings is square, but it is obvious that the same advantages will be inherent in the structure regardless of its specific shape, and the cover may be rectangular, round, oval, or any other desired shape.

Covers are particularly desirable for use in connection with sewage sludge digestion tanks because they protect the sludge from outside temperature changes and generally make it easier to control the conditions under which the sludge must be treated. The cover also prevents the emission of offensive odors because the gas generated during digestion may be collected for subsequent use, or it may be burned as it is wasted to the atmosphere through an opening in the cover.

Floating covers for sludge digestion tanks are not new, but those heretofore known have required complicated and costly fabrication procedures with the result that many small communities having limited financial resources have not been able to afford them.

The cover of the present invention may be fabricated in a simple manner and it embodies a simplified structure which effects a substantial reduction in cost without sacrificing any of the structural strength required. The simplified cover also has a greatly reduced weight, thereby lowering transportation costs. Instead of using expensive structural shapes to reinforce the cover, the necessary strength and rigidity is attained by the novel manner of joining the component parts of the cover together and reinforcing the sections with ordinary channel members, as hereinafter described.

The cover of the present invention is transported to the installation site in prefabricated sections which are welded together at the site to form a cover of the desired size and shape. One of the advantages of the present invention is that the welding to be done at the installation site is of a simple nature and does not require the extended services of highly skilled steel workers as with covers requiring complicated fabrication, as in the case of the prior art covers.

Although the cover of the present invention is designed as a floating cover, it may be used as a fixed cover by simply bolting it to the walls of the tank.

The structure by which the above noted advantages are attained will be fully described in the following specification, taken in conjunction with the accompanying drawings, in which:

Figure 1 is a cross sectional view of a sewage digestion tank with a floating cover embodying the present invention positioned therein;

Fig. 2 is a top plan view of the cover with the protective roof removed;

Fig. 3 is a composite detail view showing two sections of the cover in plan, and the reinforcing channel in perspective;

Fig. 4 is a fragmentary cross sectional view of the cover, taken along the line 4—4 of Fig. 2;

Fig. 5 is a fragmentary top plan view of the structure shown in the left hand portion of Fig. 4, with the reinforcing channel broken away to show the butting relationship of the flat edges of the plates;

Fig. 6 is a cross sectional view, taken along the line 6—6 of Fig. 4;

Fig. 7 is a cross sectional view, taken along the line 7—7 of Fig. 2;

Fig. 8 is a perspective view, taken from the lower left hand corner of Fig. 2 looking towards the center of the cover, with portions broken away to facilitate illustration of the cover structure; and Fig. 9 is a detail perspective view of two adjacent plates separated to facilitate the illustration.

In the drawings, the reference numeral 2 indicates a tank, suitably a sewage digestion tank, having ledges 3 projecting inwardly from its side walls. Ledges 3 support the floating cover at the level of the ledges when the contents of the tank fall below the ledges. The tank may be of any conventional construction and is shown only as background for the cover which constitutes the subject matter of the present invention.

The cover is made of a plurality of identical sections 4, 4a, 4b and 4c. Of course, if the cover is to be of any irregular shape the sections would not be identical. A square cover is shown in the drawings and the description will be limited to such a cover for the sake of simplicity.

Section 4 of the cover, for example, is made of a plurality of metal plates 5, 6, 7, 8, 9 and 10, each individually shaped in accordance with its position within the section. The shape of each plate is complementary to the other plates in the section so that the plates can be assembled into a section of the proper size and shape. Plates 5 and 8 are triangular, plates 6 and 7 are square, and plates 9 and 10 are substantially triangular with one corner cut off to provide one side of a square opening in the center of the cover.

Sections 4a, 4b and 4c are made up of the same parts and in the same way as section 4.

As shown in Figs. 8 and 9, plate 5 has one edge bent up to form a flange 11 adapted to abut a similar flange 12 formed by bending up the adjoining edge of plate 6. Adjoining plates are secured together into a rigid unit by welding flanges, such as 11 and 12, together. Each edge of every plate is bent up to form a flange except the edges to be provided with a reinforcing channel 13 or 14 and the outer edges which constitute the periphery of the cover. Flanges 15 and 16 on adjoining edges of plates 6 and 9 are welded together so that plates 5, 6 and 9 are formed into one rigid unit comprising half of section 4. Similar upstanding flanges on adjoining edges of plates 7, 8 and 10 are welded to form the other half of section 4.

The two half sections, previously described, are placed side by side with the flat edges of plates 6 and 9 abutting the flat edges of plates 7 and 10. Reinforcing channel 13 is positioned with one of its flanges overlying the meeting edges of plates 6 and 7, and 9 and 10. Channel 13 is then welded to the underlying edges of each of plates 6, 7, 9 and 10 to unite the two half sections into the rigid section 4. Although it is possible to do the welding hereinabove described in the field, it is preferred to fabricate sections 4, 4a, 4b and 4c in the factory and to ship them to the installation site as preformed rigid sections.

Sections 4, 4a, 4b and 4c are assembled at the installation site with each flat diagonal edge of each section abutting a similar flat diagonal edge of an adjoining section so that the four sections together form a square having a square opening 18 at its center. Reinforcing channels 14 are each positioned with one flange overlying the diagonal meeting edges of two adjoining sections, as is clearly shown in Fig. 8. Each channel is welded to both underlying meeting edges to form the sections into a rigid square cover structure.

Each plate positioned at the outer edges of the cover has a gusset 19 welded to its upper surface, and a similar gusset 20 welded to its under surface. Each gusset has one edge flush with the outer edge of the plate to which it is welded. A flat strip 21 is welded along each edge of the cover to the outer edges of each plate forming the section, and to the edges of the gussets welded to said plates. Strips 21 cooperate to form a skirt extending above and below the cover and completely encircling it.

A roof 22 of wood or metal is positioned over the cover to protect the cover from the weather. Beams 23 are positioned on top of the cover to support roof 22 in properly spaced relationship to the cover. Rollers 24 are mounted on roof 22 in engagement with the side walls of tank 2 to keep the cover properly centered in the tank as the cover floats upwardly or downwardly. Rollers 24 may be mounted on the cover itself, instead of on roof 22, if desired.

A gas dome 25, provided with an outlet 26, is secured to the cover in opening 18. The gas dome does not constitute any part of the present invention and may be of any conventional construction. The sludge gas rises in the tank to dome 25 and is either piped from the dome for subsequent use, or is vented and wasted to the atmosphere.

While I have described a preferred embodiment of my invention in considerable detail, it will be understood that the description is intended to be illustrative, rather than restrictive, as many details may be modified or changed without departing from the spirit or scope of the invention. Accordingly, I do not desire to be restricted to the exact structure described.

I claim:

1. A floating cover for tanks comprising a plurality of similar sections, each section comprising a plurality of plates secured together at their meeting edges, said securing means comprising face contacting flanges welded together, the edges of the sections formed by said plates being free of flanges, the adjacent edges of adjacent sections being arranged in abutting relation, reinforcing channels overlying and coinciding with the last mentioned abutting edges and welded to said abutting edges, a peripheral skirt welded to the outer periphery of the assembled sections, and a plurality of gussets welded to the top and bottom surfaces of said sections and to said skirt.

2. A floating cover for tanks comprising a plurality of similar sections, each section comprising a plurality of individually shaped plates secured together at their meeting edges, said meeting edges being provided with face contacting flanges welded together, the edges of the sections formed by said plates being free of flanges, the meeting edges of adjacent sections being arranged in abutting relation, reinforcing channels overlying and coinciding with the last mentioned abutting edges and welded to said abutting edges, and a peripheral skirt welded to the outer periphery of the assembled sections.

MILES A. LAMB.

REFERENCES CITED

The following references are of record in the file of this patent:

UNITED STATES PATENTS

| Number | Name | Date |
|---|---|---|
| 1,493,344 | Huff | May 6, 1924 |
| 1,754,596 | Bohnhardt | Apr. 15, 1930 |
| 1,758,225 | Johnson | May 13, 1930 |
| 1,879,572 | Speegle | Sept. 27, 1932 |
| 1,976,734 | Kramer | Oct. 16, 1934 |
| 2,039,602 | Luebbe | May 5, 1936 |
| 2,190,476 | Haupt et al. | Feb. 13, 1940 |
| 2,244,782 | Jones | June 10, 1941 |
| 2,337,058 | McKee | Dec. 21, 1943 |
| 2,355,874 | Laird | Aug. 15, 1944 |
| 2,359,416 | Hammeren | Oct. 3, 1944 |
| 2,410,191 | West | Oct. 29, 1946 |
| 2,439,266 | Settle | Apr. 16, 1948 |